E. WISS.
AUTOGENOUS BURNER.
APPLICATION FILED JULY 10, 1914.
1,121,218.
Patented Dec. 15, 1914.
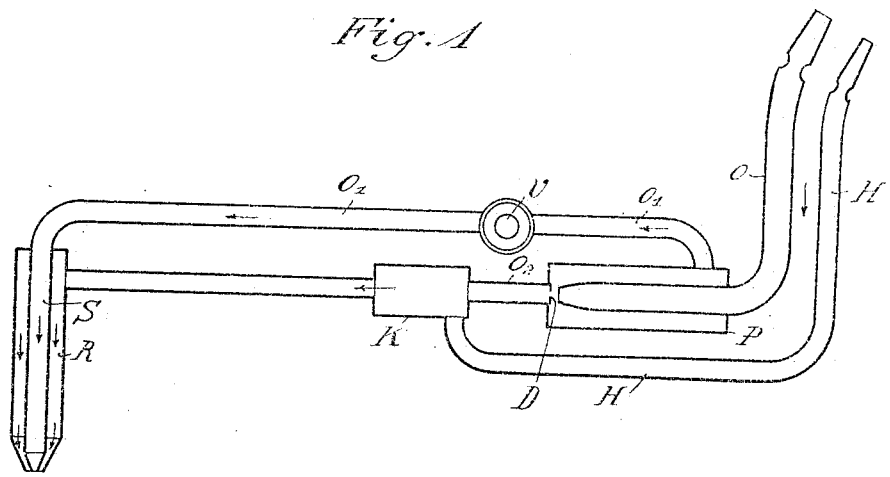
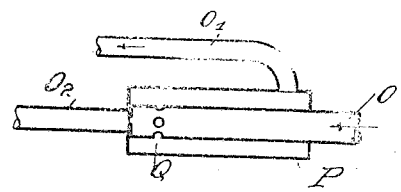

UNITED STATES PATENT OFFICE.

ERNST WISS, OF GRIESHEIM, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

AUTOGENOUS BURNER.

1,121,218.  Specification of Letters Patent.  Patented Dec. 15, 1914.

Application filed July 10, 1914. Serial No. 850,224.

*To all whom it may concern:*

Be it known that I, ERNST WISS, a subject of the German Emperor, and resident of Griesheim-on-the-Main, Germany, have invented certain new and useful Improvements in Autogenous Burners, of which the following is a specification.

My invention relates to improvements in autogenous burners for cutting metals. In burners of this class one part of the oxygen is supplied to the preheating flame, and the remainder is used for cutting the metal, and ordinarily two separate conduits are provided for supplying the oxygen for both purposes. Efforts have heretofore been made to supply the oxygen through a single conduit, which efforts however have been unsatisfactory, for the reason that when opening the valve for taking from the conduit the oxygen for cutting the pressure of the oxygen within the conduit is reduced so that the heating effect of the preheating flame is impaired. For this reason it is necessary to supply the oxygen under an excessive pressure, or a pressure which is higher than is necessary for obtaining the best heating effect as long as no oxygen is taken for cutting, and which is reduced to the proper degree by opening the valve for taking the oxygen for cutting.

The object of the improvements is to provide a burner in which the oxygen for supporting combustion, and the oxygen for cutting the metal are supplied through a single conduit, and in which notwithstanding this there is no reduction of pressure of the oxygen when opening the valve for supplying oxygen for cutting to the metal.

With this object in view my invention consists in so constructing the supply conduit that the oxygen coming from the main conduit is directed toward the reduced inlet end of the pipe for supplying oxygen to the preheating flame, so that a pressure zone is produced at the inlet end by the kinetic energy of the oxygen, while the oxygen for the cutting flame is taken from the supply conduit in such a way, that the said pressure zone which acts on the passage for the oxygen supplied to the preheating flame is not affected by taking the oxygen for the cutting flame. This result may be obtained in a simple way by directing the incoming current of oxygen in a continuous current with its central part against the inlet end of the pipe for supplying the heating oxygen and withdrawing the oxygen for cutting from the outer part of the said pressure zone, so that the central part of the pressure zone is not affected.

In order that my invention be more clearly understood two examples embodying the same have been shown in the accompanying drawing, in which—

Figure 1, is a section of the burner embodying the invention, and Fig. 2. is a section of a detail showing a modification of the burner.

Referring to the example, illustrated in Fig. 1, the supply pipe O for the oxygen extends into a cylindrical casing P providing an annular chamber surrounding the pipe O. The current of oxygen which is discharged from the pipe O is directed toward the concentric inlet end of the pipe $O_2$ for supplying oxygen to the preheating flame. For increasing the velocity of the current of oxygen the discharge end of the pipe O is preferably reduced so as to form a nozzle. The oxygen coming from the pipe O produces a pressure zone the central part of which bears on the inlet end of the pipe $O_2$. When opening the valve V of the pipe $O_1$ the oxygen flows from the annular chamber surrounding the pipe O and into the pipe $O_1$. Thereby the pressure at the circumference of the pressure zone is reduced. But the central part of the pressure zone which is adjacent to the inlet end of the pipe $O_2$ is not affected by the reduction of the pressure, so that the heating effect of the preheating flame is not impaired. Preferably the inlet end of the pipe $O_2$ is obstructed by a disk D having an opening of suitable size for admitting the proper amount of oxygen to the pipe $O_2$. The oxygen flowing through the pipe $O_2$ is mixed within a mixing chamber K with hydrogen which is supplied through a pipe H, as is known in the art. The mixture of hydrogen and oxygen flows through a pipe communicating with the chamber K and an annular chamber R to the discharge of the burner head. When the valve V is open the oxygen for cutting flows through the pipe $O_1$ and the central cutting pipe S of the burner head.

In the example shown in Fig. 2 the pipe O for supplying the oxygen is so long that it abuts against the inlet end of the pipe $O_2$ for supplying the oxygen to the heating flame, and the disk D is used for closing the discharge end of the pipe O as against the annular chamber P. The chamber P communicates with the supply pipe O through apertures Q provided in the pipe O. Also in this example a pressure zone is produced in front of the pipe $O_2$ the central part of which acts on the inlet end to the pipe $O_2$ and is not affected by the flow of the oxygen escaping through the apertures Q after opening the cutting valve V.

While in describing the invention reference has been made to the distribution of oxygen flowing through a supply pipe, I wish it to be understood, that my invention is not limited to the use of the apparatus in connection with oxygen. For example the invention can be embodied in burners for cutting thick metals, which are provided apart from the burner for producing a main flame with a subsidiary burner acting on the metal after the main burner, in which case the gas for the main flame and the gas for the subsidiary flame are taken from a single supply pipe.

An important feature of my invention consists in the fact, that by means of the same disk D for regulating the amount of the oxygen supplied to the flame metals can be cut the thicknesses of which vary within broad limits. In this respect my improved apparatus is preferable as compared to apparatus in which two separate tubes are provided for supplying the oxygen, and in which according to the thickness of the metal several burner heads having different bores or different injectors must be used.

I claim herein as my invention:

1. In an autogenous burner for cutting metal, the combination of a supply conduit for the oxidizing gas, a casing surrounding the discharge end of said conduit, a mixing chamber receiving oxidizing gas from said supply conduit, a conduit for a combustible gas communicating with the mixing chamber, and a conduit for the oxidizing gas leading from said casing, said parts being so constructed and arranged that the current of oxidizing gas is divided at the discharge end of said supply conduit into streams passing into said casing and to said chamber.

2. In an autogenous burner for cutting metal, the combination with a supply conduit for the oxidizing gas, of a mixing chamber communicating with said conduit, a conduit for a combustible gas communicating with the mixing chamber, a conduit for the gas adapted to effect the cutting, and automatically regulating means for supplying the last said conduit from the oxidizing gas supply conduit without reducing the pressure of gas supplied thereby to the mixing chamber.

3. In an autogenous burner for cutting metal, the combination with a supply conduit for the oxidizing gas, of a mixing chamber, a casing with which the discharge end of the oxidizing gas supply conduit communicates and forming an annular chamber which is provided with a relatively small outlet that has communication with the mixing chamber, a conduit for combustible gas having communication with the mixing chamber independently of the means whereby said outlet communicates with said chamber, and a conduit leading from said casing directly to the burner.

4. In an autogenous burner for cutting metal, the combination of a burner head, a mixing chamber communicating with the head, means for supplying a combustible gas to the mixing chamber, a supply pipe for the oxidizing gas, and independent means for conveying gas from the discharge end of the last said pipe to the mixing chamber and directly to the burner, said parts being so arranged that the direct supply of oxidizing gas to the burner does not effect substantial variation in the pressure of said gas supplied to the mixing chamber.

5. In an autogenous burner for cutting metal, the combination of an oxidizing gas supply conduit provided with an outlet nozzle, a casing surrounding said nozzle and having a restricted outlet in alinement with the nozzle, a mixing chamber having communication with said outlet, a conduit for combustible gas leading to said mixing chamber and wholly independent of the means whereby said outlet communicates with said chamber, and a conduit for the cutting gas supplied from said casing.

6. In an apparatus of the class described, the combination with the supply pipe for a current of gas, of a passage of reduced cross sectional area, as compared with said supply pipe, disposed in front of the discharge end of said pipe, and having a hole therein located centrally in said passage, a casing adapted to receive the gas from the discharge end of said pipe, and means for withdrawing a current of the gas, discharged from said pipe, from said casing at a point remote from said passage, whereby the flow of gas through said hole will not be reduced by the branch current.

In testimony whereof I have signed my name to this specification in the presence of two subscribing witnesses.

ERNST WISS.

Witnesses:
 JEAN GRUND,
 CARL GRUND.